United States Patent Office 3,440,284
Patented Apr. 22, 1969

3,440,284
DICYCLOPENTADIENE ADDUCT
Henry C. Stevens, Akron, Ohio, assignor to PPG
Industries, Inc., a corporation of Pennsylvania
No Drawing. Continuation-in-part of application Ser. No.
221,337, Sept. 4, 1962. This application June 3, 1966,
Ser. No. 554,983
Int. Cl. C07c 49/52, 49/22, 49/36
U.S. Cl. 260—586                                    7 Claims

ABSTRACT OF THE DISCLOSURE

Tetracyclododecenones are prepared by the cyclo-addition of dicyclopentadiene and a dihaloketene, e.g., dichloroketene. The preparation of dihaloketenes by the reaction of dihaloacetylhalides with tertiary amines is also described.

---

This is a continuation-in-part application of United States patent application, Ser. No. 221,337, filed Sept. 4, 1962, in the name of Henry C. Stevens, now abandoned.

This invention relates to tetracyclododecenones and to a process for preparing same. In particular, this invention relates to the preparation of tetracyclododecenones by the cycloaddition, in equimolar amounts, of dicyclopentadiene and dihaloketene. More particularly, this invention relates to a process which comprises generating a dihaloketene in a chemically inert liquid medium by reacting a dihaloacetyl halide and a tertiary amine, reacting dicyclopentadiene with said dihaloketene, and recovering as product, the equimolar adduct of said dihaloketene and said dicyclopentadiene. In a preferred embodiment, the dicyclopentadiene is contained in the liquid reaction medium and is reacted in situ with the dihaloketene as it is generated.

In the above-identified parent application, it is disclosed that dihaloketenes can be obtained in a chemically inert, non-aqueous liquid medium and utilized without isolation to prepare dihaloketene derivatives. Specifically, it is disclosed that alpha, alpha-dihaloketenes can be prepared by reacting a dihaloacetyl halide with a tertiary amine, and that generation of said dihaloketenes in the presence of an organic compound having carbon-to-carbon unsaturation, such as an olefin, results in the production of substituted alpha, alpha-dihalocyclobutanones.

In accordance with the present invention, it has been found that the equimolar cycloaddition product of dihaloketene and dicyclopentadiene yields a particularly novel category of tetracyclododecenones.

The dihaloketenes employed in the present invention are, in general, those dihaloketenes represented by the following formula:

$$X-\underset{\underset{X'}{|}}{C}=C=O$$

wherein X and X' are halogen and are each selected from the group consisting of fluorine, chlorine, bromine, and iodine. Preferably, X and X' are the same and are chlorine or bromine. The dihaloketenes depicted hereinabove can be prepared by any known method. Suitably, they can be prepared by reacting a dihaloacetyl halide and a tertiary amine in a chemically inert solvent. Another method for preparing said dihaloketenes is by the dehalogenation of trihaloacetyl halides with zinc or zinc activated with copper.

Examples of suitable dihaloketenes include: dichloroketene, dibromoketene, difluoroketene, diiodoketene, chlorobromoketene, chlorofluoroketene, bromofluoroketene, chloroiodoketene and bromoiodoketene.

Dihaloacetyl halides which can be utilized to generate dihaloketenes are, in general, compounds represented by the following formula:

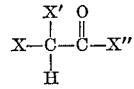

wherein X, X', and X'' are halogen and are each selected from the group consisting of fluorine, chlorine, bromine, and iodine. Preferably, X, X', and X'' are the same and are selected from the group consisting of chlorine and bromine.

Suitable examples of dihaloacetyl halides include: difluoroacetyl fluoride, dichloroacetyl chloride, difluoroacetyl chloride, difluoroacetyl bromide, fluorochloroacetyl chloride, fluorochloroacetyl bromide, fluorobromoacetyl fluoride, fluorobromoacetyl chloride, fluorobromoacetyl bromide, dibromoacetyl fluoride, dibromoacetyl chloride, dibromoacetyl bromide, chlorobromoacetyl fluoride, chlorobromoacetyl chloride, chlorobromoacetyl bromide, and chloroiodoacetyl chloride. Dichloroacetyl chloride is preferred.

Tertiary amines utilized in conjunction with the above-described dihaloacetyl halides are, in general, free from other functional groups under the conditions of generation and soluble in the liquid medium chosen as the reaction medium. Moreover, it is preferred that the tertiary amines form relatively insoluble hydrohalides in the liquid reaction medium. While simple, aliphatic tertiary amines are most preferred for preparing dihaloketenes, any tertiary amine which is soluble in the liquid reaction medium and whose hydrohalide salt is substantially insoluble in the liquid reaction medium can be employed. Thus, ditertiary amines, such as tetramethyldiaminoethane, and cyclic amines, such as pyridine and derivatives thereof, can also be employed.

Aliphatic tertiary amines which can be employed can be depicted by the following formula:

$$R_1-\underset{\underset{R_3}{|}}{N}-R_2$$

wherein $R_1$, $R_2$, and $R_3$ are each selected from the group consisting of $C_1$-$C_{10}$ alkyl, preferably $C_1$-$C_5$ alkyl.

Suitable examples of various tertiary amines include: trimethylamine, triethylamine, tri-n-propylamine, tri-n-butylamine, tri-n-octylamine, methyldiethylamine, methylethyl-n-propylamine, triisopropylamine, dimethylisopropylamine, dimethylbutylamine, dimethylisoamylamine, dimethylisooctylamine, dimethyloctylamine, methylethylisooctylamine, dimethyl-(2-ethyl)-propylamine, dimethyl-t-butylamine, dimethyloctadecylamine, pyridine, lutidine, piperidine, collidine, picoline, N-methylmorpholine, N-methylpiperidine, N,N'-dimethylpiperazine, quinoline, dimethylaniline, and dimethylaminoethylpropionate. Preferably, the simple tertiary aliphatic amines, such as triethylamine, are used.

The mole ratio of tertiary amine to dihaloacetyl halide in the above-described reaction is generally about 1:1, e.g., between about 0.9:1 and about 1.05:1.

The reaction medium in which the dihaloketene is generated is, in general, a non-aqueous liquid solvent which, if not dicyclopentadiene, is also chemically inert. To be considered inert, the solvent should contain no functional groups that react with tertiary amines, dihaloacetyl halides, dicyclopentadiene, dihaloketenes, and the tetracyclododecenone produced. Preferably, the solvent is also a non-solvent for the by-product amine hydrohalide produced by the reaction of the tertiary amine and dihaloacetyl halide. Unsuitable solvents are those containing hydroxyl and/or carboxyl groups or an active hydrogen, i.e., a hydrogen attached to an oxygen, sulphur or nitrogen atom. The reaction medium can also be provided by the use of an excess of dicyclopentadiene at standard pressure. The amount of solvent employed can vary over a wide range; but, in general, should be about three times as great by weight as the tertiary amine hydrohalide by-product in order to facilitate agitation of the reaction medium.

Examples of suitable solvents include: $C_4$–$C_{20}$ aliphatic hydrocarbons and chlorinated aliphatic hydrocarbons, $C_4$–$C_{12}$ alicyclics, $C_6$–$C_{10}$ aromatics, and chlorinated aromatics, ethers and esters. Specific examples of the above include: n-butane, isobutane, pentane, hexane, isopentane, n-heptane, 2,2,3-trimethylbutane, n-octane, dodecane, pentadecane, and eicosane, preferably, pentane and hexane; cyclobutane, methylcyclopropane, cyclopentane, cyclohexane, and cyclododecane; benzene, toluene, o,m,p-xylene, ethylbenzene, n-propylbenzene, isopropylbenzene, t-isopropyltoluene, 1,2,3-trimethylbenzene, 1,2,4-trimethylbenzene, 1,3,5-trimethylbenzene, tetrahydronaphthalene, and decahydronaphthalene; $C_1$–$C_4$ alkyl esters of $C_1$–$C_8$ carboxylic acids, such as, methylacetate, propylacetate, butylacetate, ethylpropionate, methylbutyrate, methyl heptanoate, ethyl benzoate, and dimethyl phthalate; 1,4-dioxane, 1,3-dioxane, 1,3-dioxolane tetrahydrofuran, 2-methyl-tetrahydrofuran, methylpropylether, di-n-propylether, di-n-butylether, diisopropylether, ethyl-n-butylether, and diethylether; carbon tetrachloride, chloroform, perchloroethylene, dichlorodifluoromethane, trichloroethylene, methylene chloride, 1,1,1-trichloroethane, and 1,2-dichloroethane; o-dichlorobenzene, hexafluorobenzene, monochlorobenzene, and 1,2,4-trichlorobenzene.

The temperature at which the dihaloketenes are generated in the above-described reaction can vary over a wide range and, in general, will depend to a great extent on the liquid reaction medium employed. Generally, temperatures between about $-20°$ C. and about $100°$ C. are employed. Preferably, temperatures between about $-20°$ C. and about $50°$ C., more preferably between about $0°$ C. and about $20°$ C. are utilized.

When dicyclopentadiene is used as the liquid reaction medium or when said liquid medium contains dicyclopentadiene, as in the preferred embodiment, the reaction temperature will generally vary between about $-20°$ C. and about $50°$ C., preferably between about $0°$ C. and about $26°$ C.

The pressure at which the reaction between the dihaloacetyl halide and tertiary amine is performed will depend to a great extent upon the volatility of the solvent and reactants employed. In general, these reactions can be conducted at normal atmospheric pressure. In a few instances, where the reactants and/or solvent have low boiling points, superatmospheric pressures can be employed, e.g., between about 1 and about 3 atmospheres. If desired, pressures less than atmospheric can be utilized so long as the reactants and solvent remain in the liquid state.

Dicyclopentadiene is commercially available and is conventionally obtained from the cracking of petroleum hydrocarbons. The mole ratio of dicyclopentadiene to dihaloketene used to prepare the tetracyclododecenones of the present invention can vary over a broad range, e.g., from a fraction of a mole to 8 to 10 moles of dicyclopentadiene per mole of dihaloketene. When less than one mole of dicyclopentadiene per mole of dihaloketene is employed, a portion of the dihaloketene generated polymerizers and the isolation of the desired cycloaddition product becomes more difficult. Preferably, the mole ratio of dicyclopentadiene to dihaloketene is between about 1:1 and about 10:1, preferably about 2:1. In the preferred embodiment, the amount of dicyclopentadiene charged to the liquid reaction medium can be based on the amount of dihaloacetyl halide used. Since one mole of dihaloacetyl halide yields one mole of dihaloketene, the above mole ratios are also applicable in the preferred embodiment. When dicyclopentadiene is used as the solvent, enough excess should be used to solubilize the reaction.

The reaction between the dihaloketene and dicyclopentadiene can suitably be performed at a temperature of between about $-20°$ C. and about $50°$ C., preferably between about $0°$ C. and about $26°$ C. Pressures will generally be at atmospheric but superatmospheric pressures, e.g., between 1 and about 3 atmospheres, can be employed. Any suitable chemically inert solvent, such as those described hereinabove with respect to the preparation of the dihaloketenes, can also be employed to solubilize this reaction.

A particular method by which the compositions of this invention can be prepared comprises the addition of a tertiary amine, e.g., triethylamine, to a mixture of a dihaloacetyl halide, e.g., dichloroacetyl chloride, and dicyclopentadiene in a chemically inert liquid medium. The reverse order of addition can be employed, but a large excess of amine is undesirable since such an excess may tend to attack the adduct formed. For this same reason, it is not recommended that the dicyclopentadiene and amine be mixed since excess amine would then be present when the dihaloacetyl halide is added to such a mixture. If a mixture of amine and dicyclopentadiene is added to dihaloacetyl halide, the dihaloketene may be formed in excess of the dicyclopentadiene added. Free dihaloketene is preferably avoided since it can polymerize to form products from which the desired adduct is difficult to separate. Hence, the preferred procedure is the addition of the tertiary amine to a mixture of the dihaloacetyl halide and dicyclopentadiene.

In a typical embodiment of the present process, dichloroacetyl chloride and dicyclopentadiene are dissolved in an inert, non-aqueous liquid medium, such as hexane, and charged to a suitable reaction vessel. A tertiary amine, such as triethylamine, is dissolved in a suitable quantity of n-hexane and slowly charged to the reaction vessel at a temperature of about $26°$ C. Filtration and vacuum distillation of the crude reaction product results in the recovery of the equimolar adduct of dichloroketene and dicyclopentadiene.

The dicyclopentadiene-dihaloketene adducts formed in accordance with the present process are liquid substances often having a yellowish appearance. While not intending to be bound thereby, it is believed that the dihaloketene adds across one of the double bonds of the dicyclopentadiene. In accordance with this theory, the dicyclopentadiene-dichloroketene adduct formed can be one of several isomers, one of which can be depicted as having a structure characterized by the following formula:

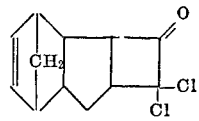

and the name 5,5 - dichloro-tetracyclo[7.2.1.0.$^{2,8}$0$^{3,6}$]-10-dodecen-4-one.

The tetracyclododecenones prepared in accordance with the present process can be heated at temperatures of between about $150°$ C. and about $200°$ C. to yield cyclopentadiene and an alpha, alpha-dihalobicycloheptenone, i.e., the equimolar adduct of dihaloketene and cyclopentadiene. This adduct can be hydrolyzed to form tropolone, a 7-membered ring compound (2-hydroxy-2,4,6-cycloheptatrien-1-one). The hydrolysis of alpha- alpha-dihalocycloheptenone is disclosed in detail in copending, co-assigned U.S. patent application Serial No. 445,761, filed Apr. 5, 1965, and accordingly, that application is incorporated herein by reference in toto. Tropolone exhibits various biological properties including bacteriostatic and antifungal activity. Of particular interest is its activity against gram-positive bacteria. The tetracyclododecenones of the present invention can also be halogenated to yield compositions having insecticidal activity. For example, the equimolar adduct of dichloroketene and dicyclopentadiene can be chlorinated by passing chlorine through a solution of the adduct in carbon tetrachloride under ultraviolet light. The resulting composition will contain, for example, between about 2 and 4 moles of chlorine and exhibits insecticidal activity against a variety of crop and garden insects, e.g., aphids, Japanese beetles, beetle grubs, etc.

The present process is more particularly described in the following examples which are intended as illustrative only since numerous modifications and variations therein will be apparent to those skilled in the art.

Example I

A three-liter, four-necked resin flask equipped with inlet tubes, thermometer, mechanical stirrer, reflux condenser and an inlet for a nitrogen gas sweep through the reactor vapor space was charged with 1000 grams (7.57 moles) of dicyclopentadiene and 99.0 grams (0.671 mole) of dichloroacetyl chloride. The temperature of the reaction flask was adjusted to about 26° C. Thereafter, a solution of 67.5 grams (0.669 mole) of triethylamine in 265.0 grams (2.01 moles) of dicyclopentadiene was added over a 2½ hour period. The reaction temperature varied between about 26° C. and about 29° C. In this particular example, dicyclopentadiene was employed as the liquid reaction medium. The reaction product was filtered and a portion of the filtrate distilled at a reduced pressure (3 millimeters of mercury) in a short path distillation apparatus. The distillate from this operation was then redistilled under reduced pressure (1 millimeter of mercury) using Mini-Lab equipment. A light yellow distillate having a boiling point of between about 90 and about 95° C./0.1 millimeter of mercury, and having a chlorine content of 30.1 percent was obtained. The calculated chlorine content for a 1:1-dicyclopentadiene:dichloroketene adduct is 29.2 percent.

Example II

A portion of the adduct of Example I is heated to about 200° C. for about six hours in a suitable vessel and then distilled. The portion boiling at about 38° C./0.25 mm. Hg is hydrolyzed by refluxing in acetic acid containing aqueous potassium acetate at a temperature of 110–120° C. overnight. Thereafter, the acetic acid is removed under reduced pressure and the residue, purified by methylene chloride extraction, dissolved in benzene. This solution is mixed with aqueous cupric acetate to yield a green needle-like solid which had a melting point of about 320° C. This solid is dissolved in chloroform and, while stirring, the solution is saturated with hydrogen sulfide. Black cupric sulfide is removed leaving a colorless solution. Upon removal of the solvent, a colorless needle-like solid product is obtained which has a melting point of from 49° C. to 51° C. The product is identified as tropolone by its melting point, the melting point of its copper-complex, as well as infrared data consistent with its structure.

Example III

Twenty-four grams (0.1 mole) of the equimolar dichloroketene-dicyclopentadiene adduct of Example I were dissolved in 100 ml. of carbon tetrachloride and seven grams (0.1 mole) of chlorine were bubbled slowly into this solution over a period of 1¾ hours at room temperature. No external heating or cooling was applied and a magnetic stirrer was used to provide agitation. After chlorine addition, the solution was permitted to come to room temperature and then evaporated using a rotary film evaporator, vacuum pump and a warm water bath to give a product having a chlorine content of 47.6 percent. The calculated chlorine content from the addition of one mole of chlorine to the 1:1 adduct ($C_{12}H_{12}Cl_4O$)

is 45.2 percent. The chlorinated adduct exhibits aphicidal activity.

Example IV

The procedure of Example III is repeated, except that chlorine addition is conducted under exposure to ultraviolet light and reflux conditions. A product having about 55 percent chlorine is recovered.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. A composition of matter comprising the equimolar cycloaddition product of dichloroketene and dicyclopentadiene prepared by reacting said reactants in a nonaqueous solvent at temperatures of from —20° C. to 50° C.

2. A process which comprises:
   (a) generating dichloroketene by reacting about equimolar amounts of tertiary amine with dichloroacetyl halide, and
   (b) reacting said dichloroketene in situ with dicyclopentadiene in a non-aqueous solvent at temperatures of from —20° C. to 50° C. to form the equimolar cycloaddition product of said reactants.

3. A process according to claim 2 wherein said tertiary amine is depicted by the formula:

$$R_1-\underset{\underset{R_3}{|}}{\overset{\overset{R_2}{|}}{N}}$$

wherein $R_1$, $R_2$ and $R_3$ are each selected from the group consisting of $C_1$–$C_{10}$ alkyl.

4. A process according to claim 2 wherein said dichloroacetyl halide is depicted by the formula:

$$X-\underset{\underset{H}{|}}{\overset{\overset{X'}{|}}{C}}-\overset{\overset{O}{\|}}{C}-X''$$

wherein X and X' are chlorine, and X'' is selected from the group consisting of fluorine, chlorine, bromine and iodine.

5. A process according to claim 2 wherein said dichloroacetyl halide is dichloroacetyl chloride.

6. A process according to claim 2 wherein said tertiary amine is triethylamine.

7. A process according to claim 2 wherein said tertiary amine is added to a mixture of said dichloroacetyl halide and dicyclopentadiene.

References Cited

UNITED STATES PATENTS 2,960,541  11/1960  Elam et al.
2,369,919  2/1945  Sauer _____ 260—585.5

OTHER REFERENCES

Staudinger: "Die Ketene," p. 11 (1912).
Adams et al.: "Org. Reactions," vol. 12, p. 49 (1962).
Adams: "Org. Reactions," vol. 3, pp. 124 to 130 (1946).

LEON ZITVER, *Primary Examiner.*

M. M. JACOB, *Assistant Examiner.*